United States Patent [19]

Baron

[11] Patent Number: 4,538,546
[45] Date of Patent: Sep. 3, 1985

[54] CHARACTERS TO A HOT STEEL BODY

[75] Inventor: Dieter Baron, Hünxe, Fed. Rep. of Germany

[73] Assignee: INTERO-Stahl - und Maschinenbau Schmitz GmbH & Co. KG, Hünxe, Fed. Rep. of Germany

[21] Appl. No.: 556,418

[22] Filed: Nov. 30, 1983

[30] Foreign Application Priority Data

Nov. 30, 1982 [DE] Fed. Rep. of Germany ....... 3244210

[51] Int. Cl.³ .......................... B05B 3/00; B05B 7/16; B05B 15/00; B05B 15/10
[52] U.S. Cl. .................................... 118/697; 118/302; 118/323; 118/704
[58] Field of Search ............... 118/697, 696, 704, 705, 118/302, 323; 427/286, 287, 423, 427, 34; 239/83, 84, 81; 901/42, 43

[56] References Cited

U.S. PATENT DOCUMENTS

| 3,017,119 | 1/1962 | Gibson | 239/81 |
| 3,606,162 | 9/1971 | Lehmann | 118/697 |
| 3,674,207 | 7/1972 | Carbonetti, Jr. et al. | 118/697 |
| 4,099,481 | 7/1978 | Lyons | 427/423 |

OTHER PUBLICATIONS

*Materials Protection*, vol. 8, No. 3, Mar. 1969, p. 51.

Primary Examiner—Evan K. Lawrence
Attorney, Agent, or Firm—Karl F. Ross; Herbert Dubno

[57] ABSTRACT

A body of steel heated to a high temperature of at least 300° C., e.g. a slab coming from a hot-rolling stage, is marked with alphanumerical characters by training a jet of molten metallic material, preferably consisting at least predominantly of aluminum or copper, onto a face of that body from a nozzle which is two-dimensionally displaceable parallel to that face under the control of a programmable microprocessor. The nozzle is part of a working head to which the marking material is fed in the form of a wire whose leading end is atomized by an electric arc generated between that end and an adjoining counterelectrode. The working head is mounted on a carriage movable toward and away from the steel body to be marked.

5 Claims, 3 Drawing Figures

CHARACTERS TO A HOT STEEL BODY

FIELD OF THE INVENTION

The present invention relates to an apparatus for applying alphanumerical characters—i.e. letters, numerals, punctuation marks and the like—to a face of a steel body heated to an elevated temperature.

BACKGROUND OF THE INVENTION

The marking of steel blocks with certain characters is useful, for example, in a rolling mill in which hot slabs are to be differently processed and are therefore to be visibly distinguished from one another.

A conventional way of marking such a hot steel body, e.g. as described in German Pat. No. 2 728 058, involves the embossing of symbols in a face of that block with the aid of a punch. Such a procedure, however, becomes cumbersome and uneconomical with symbols higher than about 25 mm. In practice it is frequently necessary to use characters of a height between about 6 and 25 cm in order to enable their recognition at greater distances from, for example, the operator's position on a crane serving to manipulate hot slabs or the like.

It has also been proposed (see German published specification No. 27 20 330) to guide a working head linearly along a surface to which such symbols are to be applied, this head being provided with a suitable marker designed to write the desired characters in succession on that surface. However, the usual type of marker such as a paint brush would not be suitable for writing on a hot slab since the dyes employed would immediately char at a temperature of, say, 500° C. The marking operation would therefore have to be delayed until the slabs have been cooled sufficiently, at which time they may no longer be precisely identifiable as to their destination. Moreover, these dyes are liable to be washed out on a surface exposed to the weather.

For a completely different purpose, namely the coating of large surfaces of metallic articles with layers of other metals, it is known to heat an article to be coated to a temperature of at most 200° C. and to spray that surface with the aid of a nozzle through which a wire of coating material is continuously fed from behind for atomization of its leading end at the nozzle outlet. That technique is described in *Bulletin* 244 of the firm Metco Ltd. in Chobham, United Kingdom, headed "Metco New Type 5 K Heavy Duty Metallizing Machine". A spray head suitable for this purpose is shown on page 147 of Volume 2 of a book titled *The Way Things Work*, published 1971 by Simon and Schuster, New York. Conceivably, such a metallic spray could be directed through a suitable mask onto a face of a steel body to form characters thereon, yet I am not aware of any prior proposal of this nature.

OBJECT OF THE INVENTION

An important object of using the apparatus of the present invention, therefore, is to provide a convenient usuable and practical apparatus for applying alpha numerical symbols to a hot steel body, e.g. to a slab coming from a rolling mill at a temperature of 300° C. or higher.

SUMMARY OF THE INVENTION

I have found, in accordance with my present invention, that clearly visible alphanumerical characters can be formed on a receiving face of a hot steel body by training a jet of molten metallic marking material, of contrasting appearance, onto that face from a nozzle undergoing two-dimensional displacement in a plane parallel thereto along lines conforming to the characters to be produced. In order to allow for discontinuities between successive characters, or in some of the characters themselves, the jet is to be modulated to interrupt the deposition of the marking material on the face of the body at least after the formation of each character.

Advantageously, the marking material is a metal or an alloy containing a major proportion of aluminum or copper, e.g. brass. The impingement of such a metal or alloy onto a slab or the like having a temperature of at least 300° C., preferably between 800° and 1000° C., firmly bonds the marking material to the ferrous substrate so as to leave indelible and distinctly visible characters after cooling. If necessary, the receiving face of the slab should be mechanically descaled before the jet is trained thereon.

An apparatus according to the invention, designed to implement the method just described, comprises a support on which a carriage is movable in a first dimension parallel to the receiving face to be marked, assumed to be substantially planar. A working head is movable on that carriage in a second dimension, parallel to that face, and carries an elongate nozzle perpendicular to a plane defined by the two dimensions, this plane being of course parallel to the receiving face. First and second reversible drive means serve to displace the carriage in the first dimension and the working head in the second dimension for tracing the characters to be produced. A wire of metallic marking material, as discussed above, is passed by feed means through the nozzle toward an outlet thereof confronting the face of the steel body. A leading end of the wire is atomized by melting means at the nozzle to form fluidized particles of marking material in a jet trained from the nozzle outlet upon the receiving face by blower means discharging air or some other gas into the nozzle. The first and second drive means as well as the feed means are coupled with control means for the displacement and modulation of the jet in the manner already described.

In principle, the melting means could be a burner of fuel gas (e.g. a mixture of acetylene or propane with oxygen) as known, for example, from the above-identified book titled *The Way Things Work* (Vol. 2, page 146). I prefer, however, to utilize for this purpose an electrical circuit connected to the wire and to an adjacent counterelectrode for generating an arc therebetween to melt the metal or alloy, since this makes it easier to interrupt the jet by arresting the wire feed and concurrently cutting off the electric current.

According to yet another feature of the invention, the carriage supporting the working head may include part of a cross-slide assembly provided with further drive means for displacing that working head in a direction perpendicular to its plane of orthogonal motion, i.e. toward and away from the face to be marked.

The displacement of the working head and the modulation of the jet in conformity with the desired alphanumerical characters are preferably governed by a programmable microprocessor which may be provided with a read-only memory storing the instructions for the tracing of various characters in a predetermined sequence or individually, e.g. under the control of a manual selector such as a keyboard.

BRIEF DESCRIPTION OF THE DRAWING

The above and other features of the invention will now be described in detail with reference to the accompanying drawing in which.

SPECIFIC DESCRIPTION

Figure 1:
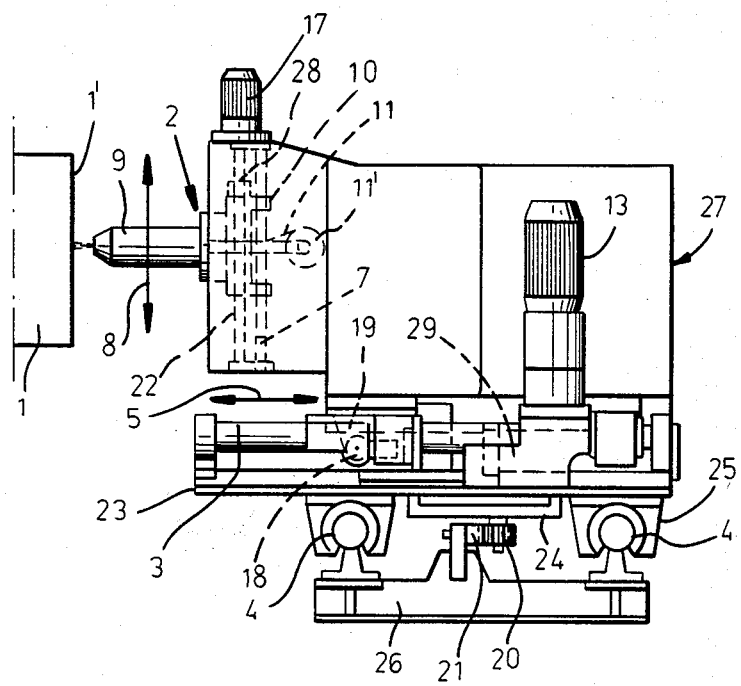
FIG. 1 is a side-elevational view of an apparatus embodying the invention.
Figure 2:
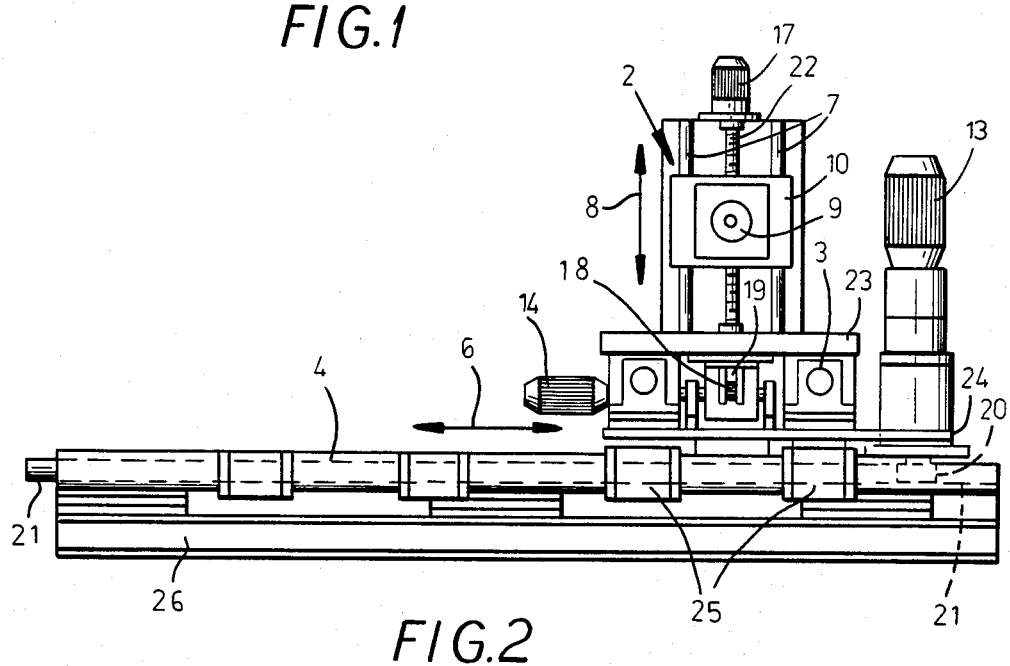
FIG. 2 is a front-elevational view of the apparatus of FIG. 1.

As shown in FIGS. 1 and 2, an apparatus for inscribing alphanumerical characters on a vertical receiving face 1' of a hot steel body 1—e.g. a slab coming from a rolling mill at a temperature of about 800° to 1000° C.—comprises a stationary base 26 having a pair of parallel rails 4 engaged by shoes 25 of a longitudinal slide 24. Another pair of rails 3 on slide 24, transverse to rails 4, support a cross-slide 23 which forms part of a carriage 27. A working head 2 comprises a nozzle 9, parallel to rails 3 and perpendicular to face 1', as well as a slide 10 which is guided along a pair of upright columns 7 on carriage 27 and has a nut 28 engaged by a vertical leadscrew 22. A reversible motor 14 on slide 24 drives, via a step-down transmission 29, a pinion 20 meshing with a rack 21 on base 26 which parallels the rails 4; thus, operation of motor 14 enables the displacement of carriage 27 in a horizontal direction parallel to receiving face 1' as indicated by a double arrow 6 in FIG. 2. Another reversible motor 13, provided with a similar step-down transmission not shown, drives a pinion 18 which is journaled on slide 24 and meshes with a rack 19 on slide 23 whereby carriage 27 is horizontally movable in a direction perpendicular to face 1' as indicated by a double arrow 5 in FIG. 1. Leadscrew 22 is coupled with a third motor 17, mounted on slide 23, to enable the working head 2 to be raised and lowered as indicated by a double arrow 8 in FIGS. 1 and 2.

Before the approach of carriage 27 to slab 1, its face 1' is descaled by a nonillustrated mechanical scraper.

Figure 3:
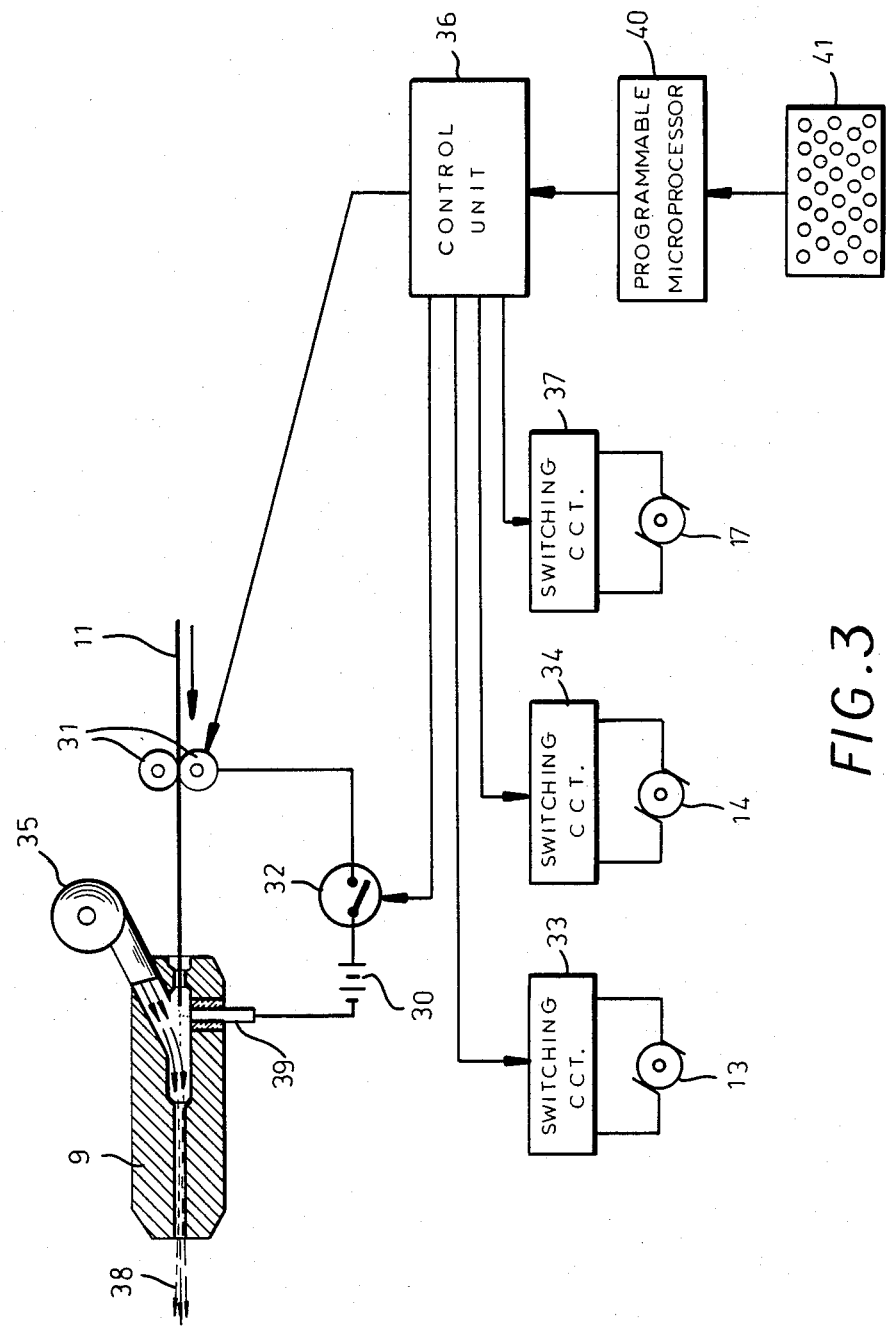
FIG. 3 diagrammatically represents a circuit arrangement for controlling the operation of the apparatus.

A wire 11 of brass, for example, is unwound from a reel 11' on carriage 27 and is fed from the rear into nozzle 9 by a pair of transport rollers 31 as schematically illustrated in FIG. 3. The latter Figure also shows a blower 35 associated with nozzle 9 for directing a stream of air therethrough toward the face 1' (FIG. 1) to be marked. A source of electric current, represented by a battery 30, has a positive terminal connected to wire 11 via one of the rollers 31 by way of a switch 32 and has a negative terminal connected to a counterelectrode 39 projecting into the bore of the nozzle 9 to generate an electrical discharge between counterelectrode and the leading end of the advancing wire which is thereby atomized to form molten metallic particles constituting a jet 38 driven by compressed air from blower 35 toward the slab 1. The elongate shape of the nozzle serves to confine that jet to a narrow stream and to reduce the heating effect of the slab upon working head 2.

As indicated schematically, drive motors 13, 14 and 17 are provided with respective switching circuits 33, 34 and 37 responsive to operating signals from a control unit 36 which also starts and stops the drive of transport rollers 31 and determines the position of switch 32. Unit 36 is operated by a microprocessor 40 which is programmable with the aid of a keyboard 41 for the tracing of individual characters or of a predetermined sequence thereof as discussed above. Thus, when a stroke or a series of continuous strokes forming part of a character has been traced on face 1', rollers 31 are stopped and switch 32 is opened while carriage 27 is displaced to align the nozzle 9 with the beginning of the next stroke on the slab face. When the complete legend has been inscribed on face 1', carriage 27 is retracted by means of motor 13 in order to let a transporter remove the slab 1 and position another one in its place.

I claim:

1. An apparatus for inscribing alphanumerical characters on a face of a body of steel heated to an elevated temperature, comprising:

a support;

a carriage movable on said support in a first dimension parallel to said face;

a working head movable on said carriage in a second dimension parallel to said face;

an elongated nozzle on said working head perpendicular to a plane defined by said first and second dimensions, said nozzle projecting toward said face;

first reversible drive means for displacing said carriage in said first dimension;

second reversible drive means for displacing said working head in said second dimension;

feed means for passing a wire of metallic marking material, of contrasting appearance with reference to steel, through said nozzle toward an outlet thereof confronting said face;

melting means at said nozzle for atomizing a leading end of said wire in the vicinity of said outlet;

blower means discharging into said nozzle for generating a jet of molten particles of said marking material trained from said outlet upon said face; and control means coupled with said first and second drive means and with said feed means for displacing said working head to trace selected alphanumerical characters by said jet on said face while modulating the advance of said wire to discontinue the deposition of said marking material on said face at least after the tracing of each character.

2. An apparatus as defined in claim 1 wherein said carriage includes part of a cross-slide assembly provided with further drive means for displacing said working head in a direction perpendicular to said plane.

3. An apparatus as defined in claim 1 wherein said melting means comprises electrical circuitry connected to said wire and to an adjacent counterelectrode for generating an arc therebetween.

4. An apparatus as defined in claim 1 wherein said working head is connected with said carriage by a leadscrew coupled with said second drive means.

5. An apparatus as defined in claim 1 wherein said control means comprises a programmable microprocessor.

* * * * *